Patented Feb. 7, 1939

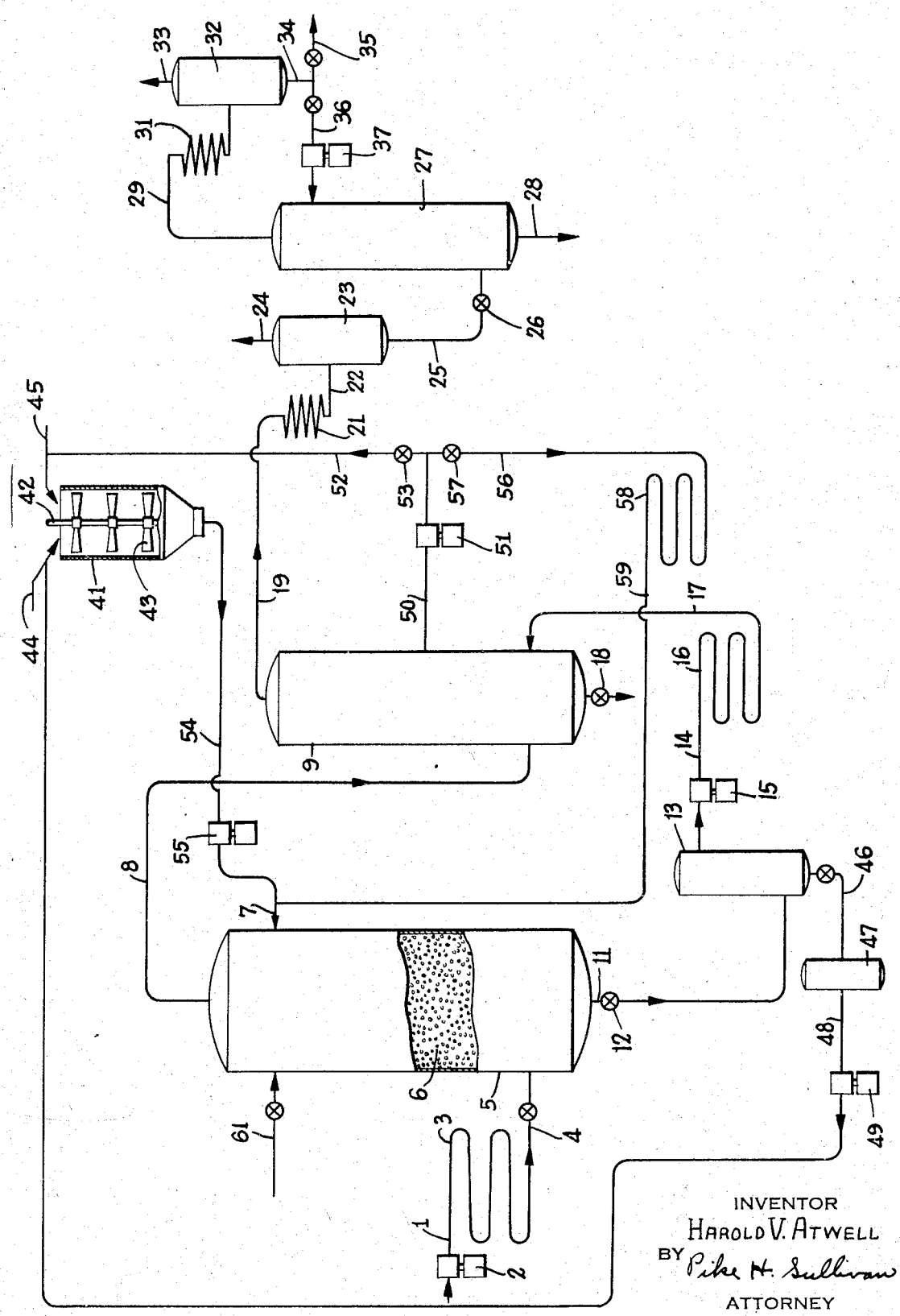

2,146,667

UNITED STATES PATENT OFFICE

2,146,667

PROCESS OF CONVERTING HYDROCARBONS

Harold V. Atwell, White Plains, N. Y., assignor to Process Management Company, Inc., New York, N. Y., a corporation of Delaware Application May 23, 1936, Serial No. 81,376

3 Claims. (Cl. 196—10)

This invention relates to the treatment of hydrocarbons and particularly to the catalytic polymerization of normally gaseous hydrocarbons containing olefinic constituents.

In the catalytic polymerization of unsaturated hydrocarbons, it is customary to pass the heated gases through a stationary bed of solid catalytic material. Among the features of importance to observe in processes of this type are the maintenance of an even distribution through the bed of catalytic material and only a reasonable pressure drop through the bed. Consequently, the catalytic contact surface presented to flowing gases can not be increased as much as might be desired by subdividing the catalyst without encountering difficulties with respect to the above-mentioned features. Such processes using a stationary catalyst bed also present a difficult problem of temperature control since considerable quantities of heat of exothermic polymerization must be dissipated.

One of the objects of this invention is to provide a process for catalytically polymerizing hydrocarbon gases containing unsaturates wherein a relatively large and active catalytic surface is utilized.

Another object of my invention is to provide a process of the character mentioned wherein countercurrent contact between the catalysts and the gases being polymerized is effected throughout the entire catalytic reaction.

Still another object of my invention is to provide a process of the character mentioned wherein the catalyst is admixed with a liquid vehicle to facilitate the countercurrent flow of the vehicle carrying the catalyst and the hydrocarbon gases being polymerized.

Another object of my invention is to provide a process of the character mentioned wherein a relatively volatile liquid is utilized, at least in part, as the fluid vehicle for the catalytic material.

With these and other objects in view, the invention comprises the improvements hereinafter set forth and claimed, with the understanding that the procedure may be varied without departing from the spirit and scope of the appended claims.

My invention contemplates processing olefinic gases from any suitable source, such as from oil cracking operations or from operations wherein natural gas or refinery gas is dehydrogenated. Gases of this character are suitably heated to a temperature of from 200° to 500° F., preferably to a temperature of about 350° F., while being maintained at atmospheric pressure or elevated pressures, perhaps as high as 1000 lbs., and passed to a reaction zone, such as a suitably packed tower, wherein the unsaturated constituents of the gases, including the more difficultly polymerizable ethylene, are contacted with a polymerization catalyst. The tower receiving the heated hydrocarbon gases is preferably provided with suitable packing material, such as Raschig rings, finely divided brick or any other suitable material. A tower, such as a bubble tower, capable of maintaining distinct pools of liquid while permitting continuous countercurrent flow may also be used.

In order to provide a relatively large catalytic surface for the upwardly rising gases in the tower, my invention contemplates introducing a suitable catalyst suspended and/or dissolved in a liquid vehicle into an upper portion of the tower to accomplish countercurrent flow between the liquid vehicle and catalyst and the upwardly rising gases.

The advantages of having the catalyst in fluid form are of paramount importance. In the first place, it permits continuous introduction and removal of catalysts together with strictly countercurrent operation, both of which features greatly increase the efficiency of the process. In the second place, it minimizes the possibility of channeling which is a constant source of trouble in operations wherein a bed of granular material is used and insures that all of the gas being polymerized will come into intimate and direct contact with catalytic surfaces of equal activity, thereby exhausting all of the catalytic material at the same rate.

Various forms of catalyst may be used in accordance with my invention. For instance, a solution and/or suspension of sodium aluminum chloride, aluminum chloride, alumina on silica, fuller's earth or clay, and others, all of which are preferably in finely divided state, may be formed with a suitable liquid vehicle. I may use as the vehicle for the finely divided catalytic material, compounds of hydrocarbons that are not volatilized by the prevailing temperature, such as propylene glycol and other polyhydric alcohols, high-boiling monohydric alcohols, nitro paraffins, halogenated derivatives of olefins and paraffins, etc. The choice of a vehicle depends largely on its boiling point with respect to the desired operating temperature and its inertness with respect to the catalyst used. When halide catalysts such as aluminum chloride are used, particularly good results are obtained by using a halogen compound as a vehicle. For example, a chlorinated octane or nonane may be used as the vehicle for sodium aluminum chloride. For a more active catalyst, aluminum chloride, which would be used at a lower temperature, a lower boiling vehicle, such as ethylene dichloride, would be preferred.

My invention also contemplates the addition of a volatile oil to the catalyst suspension and/or solution for passage through the treating tower countercurrent to the upwardly rising vapors. The volatile oil included in the catalyst fluid is readily vaporized and this vaporization serves to absorb the heat of polymerization and thus control the temperature in the tower. By conducting the polymerization in a tower using countercurrent flow, the temperature-controlling volatile oil is carried downwardly until it has absorbed sufficient heat to be vaporized and, therefore, gives automatic temperature control at all parts of the system. This volatile oil is in general unaffected by the catalyst present in the liquid vehicle and may be a polymer fraction produced in the system, kerosene, or a relatively narrow fraction of straight run gasoline, or pure hydrocarbons of the desired boiling point. Optionally the catalyst vehicle itself may be selected to have a boiling point suitable for controlling the temperature in the system by self-evaporation. In any case, cooling will be provided at the top of the tower, either by indirect heat exchange to condense the escaping vapors, or by the continuous introduction of the volatile cooling medium recovered by extraneous condensation.

My invention makes possible more ready polymerization of ethylene which, as has been generally recognized, is difficult to polymerize catalytically under the conditions suitable for other gaseous olefins. In accordance with this specific aspect of my invention, ethylene is polymerized by passing it through a body or in countercurrent contact with a flowing stream of a metallic halide type of catalyst such as sodium aluminum chloride or any other suitable catalyst suspended and/or dissolved in a hydrocarbon vehicle of the character heretofore mentioned. By thus employing a liquid hydrocarbon as a vehicle for the catalyst, a greatly increased catalytic surface is provided which facilitates the polymerization of the ethylene.

For a further explanation of my invention, I shall refer to the accompanying drawing in which the single figure is a diagrammatic elevational view of apparatus capable of carrying out my invention.

Referring to the single figure, olefinic gases from any suitable source and preferably containing a high percentage of olefins are introduced into a line 1 and forced by a pump 2 through a heater 3 wherein they may be heated to a temperature between about 200° and 500° F., preferably about 300° F., while being maintained at about atmospheric pressure or higher. The heated gases leaving the heater 3 pass through a line 4 to a reaction zone or tower 5, having suitable packing material 6 extending throughout, wherein passage of the heated gases is effected through the spaces between the packing material. Catalytic material suspended and/or dissolved in a suitable liquid vehicle as aforementioned is introduced into the upper portion of the tower 5 and flows downwardly through the spaces between the packing material 6, thus intimately contacting the upwardly rising gases. A relatively large catalytic surface is thus provided in the packed tower for the upwardly rising gases, and polymerization of the olefinic constituents of these gases into normally liquid hydrocarbons is effected.

When using a hydrocarbon liquid which is substantially non-volatile under the prevailing temperature conditions as the liquid vehicle, the catalyst suspension and/or solution continues to pass downwardly throughout the tower 5 without any substantial change in its physical properties. As such a fluid mixture descends in the tower 5 the catalyst gradually becomes exhausted and its catalytic properties are accordingly reduced. When a relatively volatile oil is mixed with the catalyst suspension and/or solution to function, at least in part, as an additional liquid vehicle, the temperature prevailing in the tower is generally sufficient to vaporize all or most of the volatile oil, which vaporization effects automatic temperature control throughout the tower 5. When such a volatile oil is included in the catalyst suspension and/or solution, it is carried downwardly therewith until sufficient heat has been absorbed to effect vaporization thereof. By vaporization of the volatile oil, the heat of polymerization is transferred to the vapors rising through the tower and is thus removed from the system.

Polymerized material in vaporous form from the tower 5, as well as vapors of the cooling medium mixed with the catalyst suspension and/or solution, pass through a line 8 to a fractionating column 9 which is provided with suitable fractionating plates and trays, not shown. Spent catalysts together with the unvaporized liquid vehicle and heavy polymers formed during the polymerization reaction are withdrawn from the packed tower 5 through a line 11, having a valve 12, and conducted to a settling tank 13. The suspended catalyst and vehicle in the withdrawn products settle to the lower portion of the settling tank 13 and the oil polymer formed in the tower 5 by the catalytic polymerization may be withdrawn from an upper portion of the settling tank 13 through a line 14 and forced by a pump 15 through a heater 16, wherein it is mildly heated to a temperature of about 400° F. The thus mildly heated heavy polymer is passed through a line 17 to the fractionating column 9 wherein it is mixed with the vaporous products entering the fractionator through the line 8. The products entering the fractionator 9 are therein fractionated to condense out any heavy tarry material contained therein, this tarry polymer being withdrawn from the system through a line 18. Fractionation within the fractionator 9 is suitably controlled so that the overhead vaporous fraction therefrom will consist mostly of hydrocarbons within the motor fuel boiling point range and lighter, this vaporous fraction being withdrawn through a line 19 and passed through a condenser 21 and line 22 to a distillate receiver 23. Uncondensed gases are withdrawn at least in part from the receiver 23 through a line 24 and the liquid fraction containing the motor fuel and lighter is withdrawn through a line 25, having a valve 26, and passed to a stabilizer 27 which may be maintained under superatmospheric pressure by a pump, not shown, in the line 25. The liquid fraction is stabilized in the stabilizer 27 with stabilized gasoline being withdrawn therefrom through a line 28. Uncondensed gases consisting mostly of saturated gases containing more than one carbon atom per molecule pass through a line 29 and condenser 31 to a receiver 32. Non-liquefied constituents of these gases are removed from the receiver 32 through a line 33, and the liquefied constituents are removed through a line 34 with part thereof being withdrawn from the system through a line 35 and the remainder returned to the upper portion of the stabilizer through a line 36 by a pump 37 as refluxing medium therefor.

I preferably provide a suitable catalyst mixing chamber 41 having a stirring arrangement comprising a shaft 42 and stirrers 43 disposed on the shaft to accomplish desired agitation during the formation of the suspension and/or solution of catalyst. Any suitable catalyst, preferably in finely divided form may be introduced into the mixing chamber 41 through a line 44. The liquid vehicle for the catalyst may be directly introduced into the chamber 41 through a line 45.

While it is generally desired to introduce fresh catalysts through the line 44 into the mixing chamber 41, the spent catalysts and liquid vehicle may be revivified and recycled to the mixing chamber 41 for reuse. Thus the spent catalysts and remaining liquid vehicle may be withdrawn from the settling chamber 13 through a line 46 and passed to a catalyst regenerator 47. The catalyst regenerator 47 is shown diagrammatically in that it forms no part of my present invention. The thus regenerated catalyst together with the liquid vehicle is withdrawn from the regenerator 47 through a line 48 and returned by a pump 49 to the mixing chamber 41.

In fractionating the products in the fractionator 9, the heavy fraction withdrawn through the line 18 is generally an undesired tarry material while the vaporous fraction withdrawn through the line 19 comprises a gasoline of the desired characteristics. In accordance with my process, fractionation within the tower 9 may be controlled so as to separate a condensate intermediate the gasoline and the tarry material, having a boiling point making it a suitable liquid for accomplishing the temperature control before-mentioned in the tower 5 or for suspending and dissolving the catalyst, or both. This intermediate condensate may be withdrawn from the fractionator 9 as a side stream through a line 50 and forced by a pump 51 through a line 52 controlled by a valve 53 to the line 45 through which the liquid vehicle is introduced into the mixing chamber. If all of the intermediate condensate is not required to form the desired suspension and/or solution in the mixing chamber 41, or none is used for this purpose, a part or all of this oil may be forced through a line 56, having a valve 57, to a heater 58 wherein it is heated nearly to its boiling point. The thus mildly heated intermediate condensate is then passed through a line 59 to the line 7 through which the suspension and/or solution of catalyst and liquid vehicle is introduced into the upper portion of the tower.

From the foregoing it will be evident that by heating the intermediate condensate passing through the heater 58, prior to admixture thereof with the catalyst suspension and/or gasoline, the material entering the tower 5 through the line 7 will be at an elevated temperature and will not drastically cool the gases undergoing polymerization. It will be understood that oil other than the intermediate condensate heretofore described may be used to accomplish the temperature control within the packed tower 5. When the operating conditions are such that an intermediate condensate of suitable boiling point can not be obtained conveniently from the fractionator 9, the cooling oil may be a relatively narrow boiling fraction of petroleum from any other source introduced through line 61.

In a specific aspect of my invention, sodium aluminum chloride may be suspended and/or dissolved in a hydrocarbon vehicle, such as a narrow cut of straight run naphtha boiling below 400° F., and passed countercurrently to a stream of suitably heated ethylene passing upwardly through the tower 5. Due to the dispersion of the catalyst in the liquid hydrocarbon, the effectiveness of the sodium aluminum chloride will be increased so as to increase the amount of polymerization and hence the production of motor fuel. Generally, however, the effectiveness of this catalyst is not so materially increased as to cause the formation of an excess of heavy polymers boiling above the gasoline boiling point range which may result when aluminum chloride alone is used as the catalytic material.

If desired, a catalyst of the metallic halide type, such as sodium aluminum chloride, may be deposited on a stationary granular support, such as pumice, and oil of the character mentioned caused to flow over it while the heated ethylene is passed countercurrently to the oil over the wet catalyst. The deposition of catalyst on a granular support for this method of operation may be accomplished by wetting the support with a solution of the catalyst in an organic halide, such as ethylene or propylene dichloride, and evaporating the solvent. In case a similar liquid is used subsequently to promote the contact between the catalyst and the gas to be polymerized, the liquid should be previously saturated with the catalyst in question to prevent solution from the coated support.

The expression "fluid mixture" appearing in the appended claims is intended to cover the suspension and/or solution of the catalyst in the liquid vehicle.

While I have described my invention in detail with reference to the preferred manner of operation, it is to be clearly understood that my invention is not limited in these respects except as appearing in the appended claims.

I claim:

1. In the production of normally liquid hydrocarbons from normally gaseous hydrocarbons containing unsaturated constituents, the process that comprises introducing said normally gaseous hydrocarbons in heated condition into a reaction zone for passage therethrough, intimately contacting said gaseous hydrocarbons with a catalyst during the flow thereof through the reaction zone to effect polymerization thereof into normally liquid hydrocarbons containing gasoline constituents and heavier, maintaining said last-mentioned hydrocarbons in vaporous condition in said reaction zone, passing said vapors into a fractionating zone to separate hydrocarbons in the gasoline boiling range from heavier hydrocarbons, heating at least a part of the heavier hydrocarbons to a temperature approaching its boiling point and returning same in heated condition to the reaction zone at a point where the heated heavier hydrocarbons flow countercurrent to the gaseous hydrocarbons undergoing polymerization.

2. A process in accordance with claim 1 wherein the catalyst flows countercurrent to the gaseous hydrocarbons and the heated heavier hydrocarbons are mixed therewith for introduction into the reaction zone.

3. In the production of normally liquid hydrocarbons from normally gaseous hydrocarbons containing unsaturated constituents, the process that comprises introducing said normally gaseous hydrocarbons in heated condition into a reaction zone for passage therethrough, intimately contacting said gaseous hydrocarbons with a catalyst during the flow thereof through the reaction zone to effect polymerization thereof into normally liquid hydrocarbons containing gasoline constituents and heavier, maintaining said last-mentioned hydrocarbons in vaporous condition in said reaction zone, passing said vapors into a fractionating zone to separate hydrocarbons in the gasoline boiling range from heavier hydrocarbons, separately withdrawing unvaporized heavy oil from the reaction zone, heating heavy oil thus withdrawn and passing the thus heated oil to the fractionating zone.

HAROLD V. ATWELL.